United States Patent [19]

Hillestad

[11] Patent Number: 5,127,448
[45] Date of Patent: Jul. 7, 1992

[54] BALE WIRE TWISTER

[76] Inventor: Jerome Hillestad, 1861 Viking Blvd., Cedar, Minn. 55011

[21] Appl. No.: 723,413

[22] Filed: Jun. 28, 1991

[51] Int. Cl.⁵ .............................................. B21F 15/04
[52] U.S. Cl. ...................................................... 140/119
[58] Field of Search ...................... 140/93.6, 115, 118, 140/119, 104

[56] References Cited

U.S. PATENT DOCUMENTS

| | | | |
|---|---|---|---|
| 180,788 | 8/1876 | Purdy | 140/115 |
| 238,403 | 3/1881 | Konold et al. | |
| 893,423 | 7/1908 | Bates et al. | 140/119 |
| 1,144,217 | 6/1915 | McCarter | 140/115 |
| 1,278,051 | 9/1918 | Springer | |
| 1,408,936 | 3/1922 | Gerrard | |
| 1,431,151 | 10/1922 | Campbell | 140/119 |
| 1,499,012 | 6/1924 | Greenstreet | 140/115 |
| 1,521,201 | 12/1924 | Mueller | |
| 1,937,767 | 12/1933 | Lennox | |
| 2,397,739 | 4/1946 | Hutsell | |
| 2,929,608 | 3/1960 | Zippel | |
| 3,037,534 | 6/1962 | Brouse | |

Primary Examiner—Lowell A. Larson
Attorney, Agent, or Firm—Leo Gregory

[57] ABSTRACT

A bale wire twister having a shaft mounted gear internal of the housing thereof being manually operable and an aligned slot through the housing and into the gear and into the shaft supporting the gear, the slot receiving a double strand of baling wire, a hub depending from the gear having an arcuate slot partially thereabout and projection from the shaft into the slot whereby a hand crank moves said gear and hub to overlie the slot and lock in the wire in the slot, the hub engaging the projection to cause the shaft to rotate and twist the wire locked therein, the slot being realigned to release a twisted wire.

1 Claim, 3 Drawing Sheets

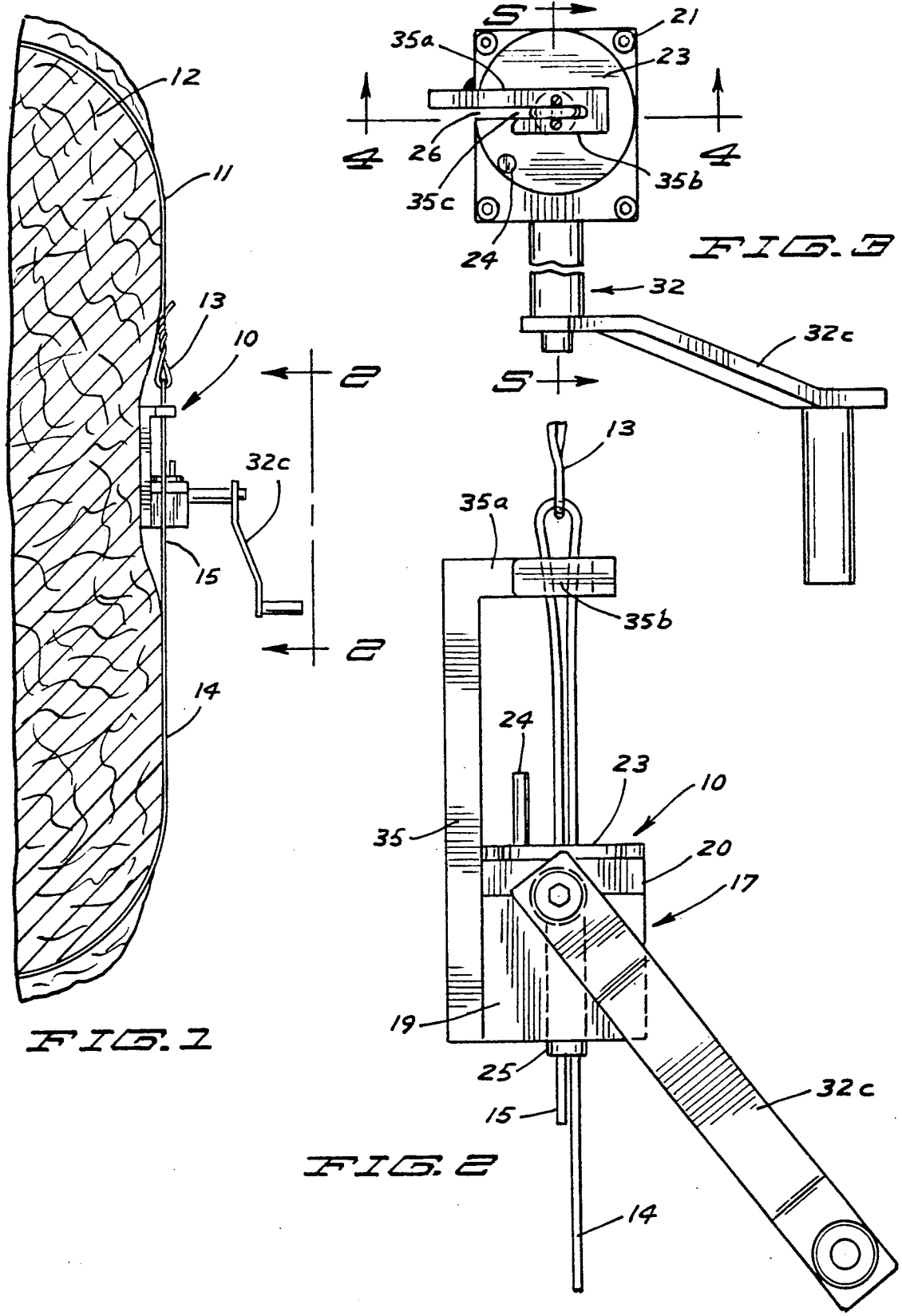

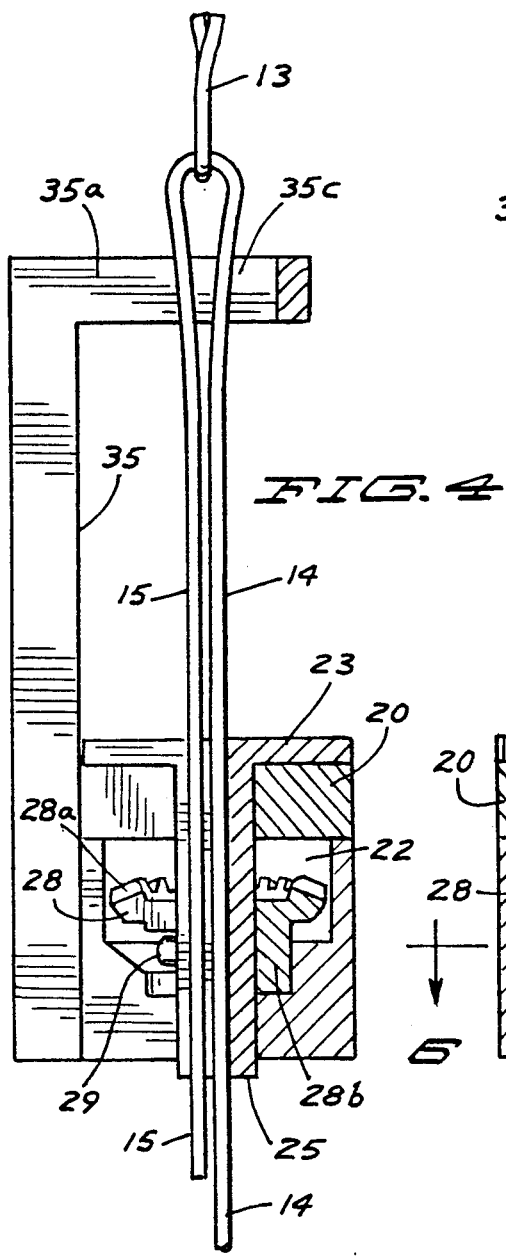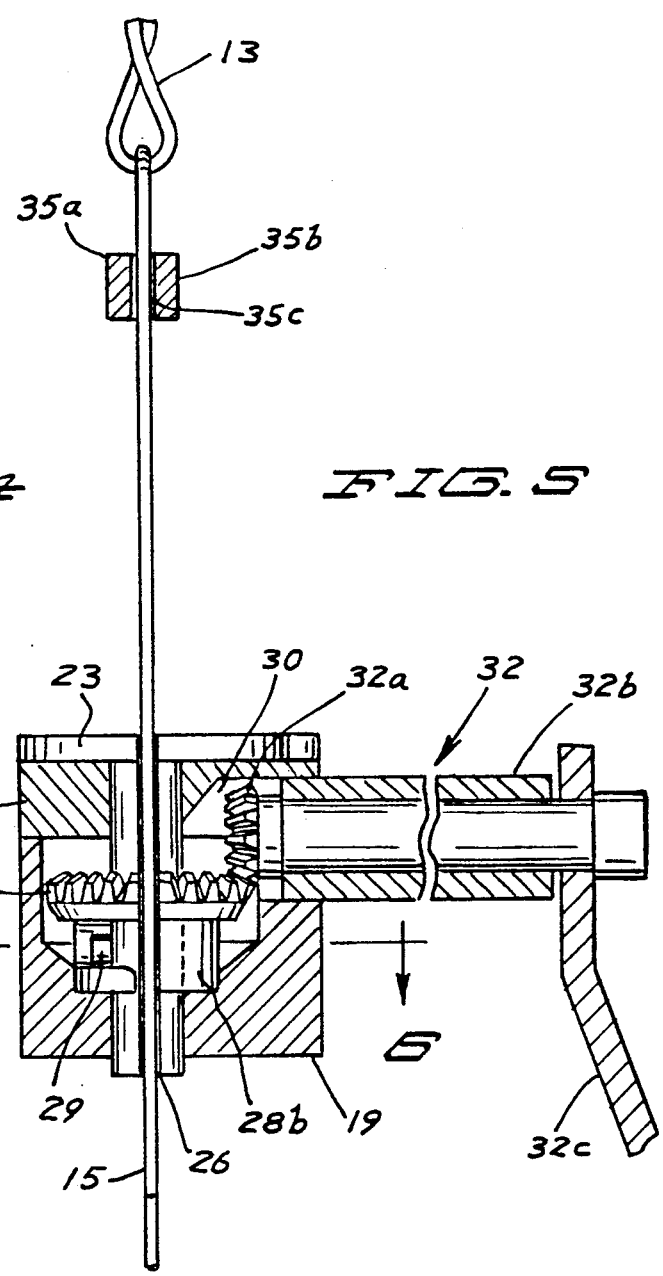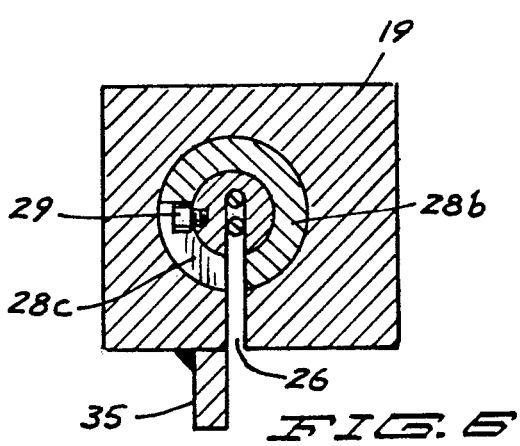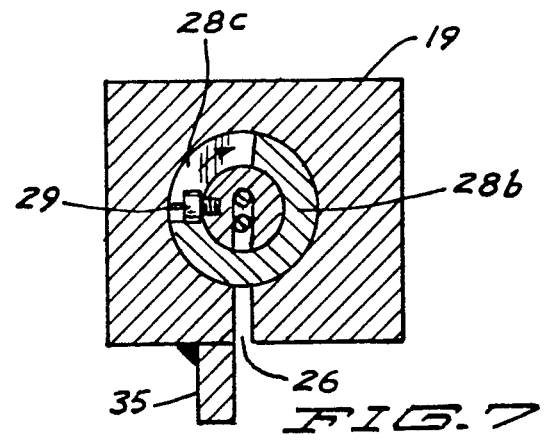

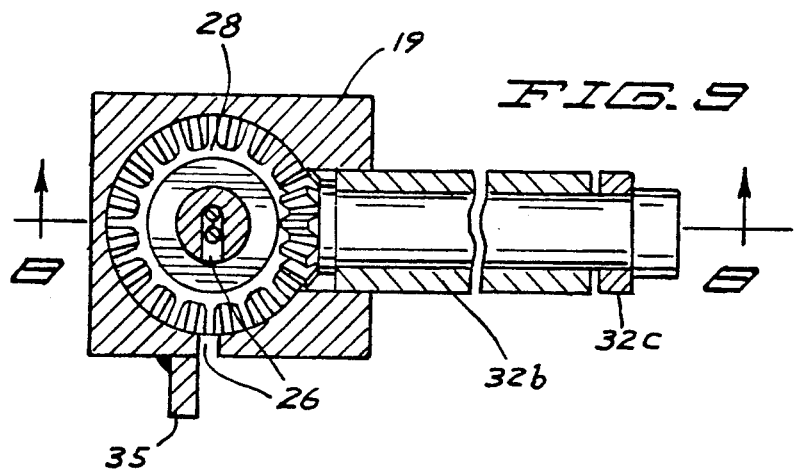
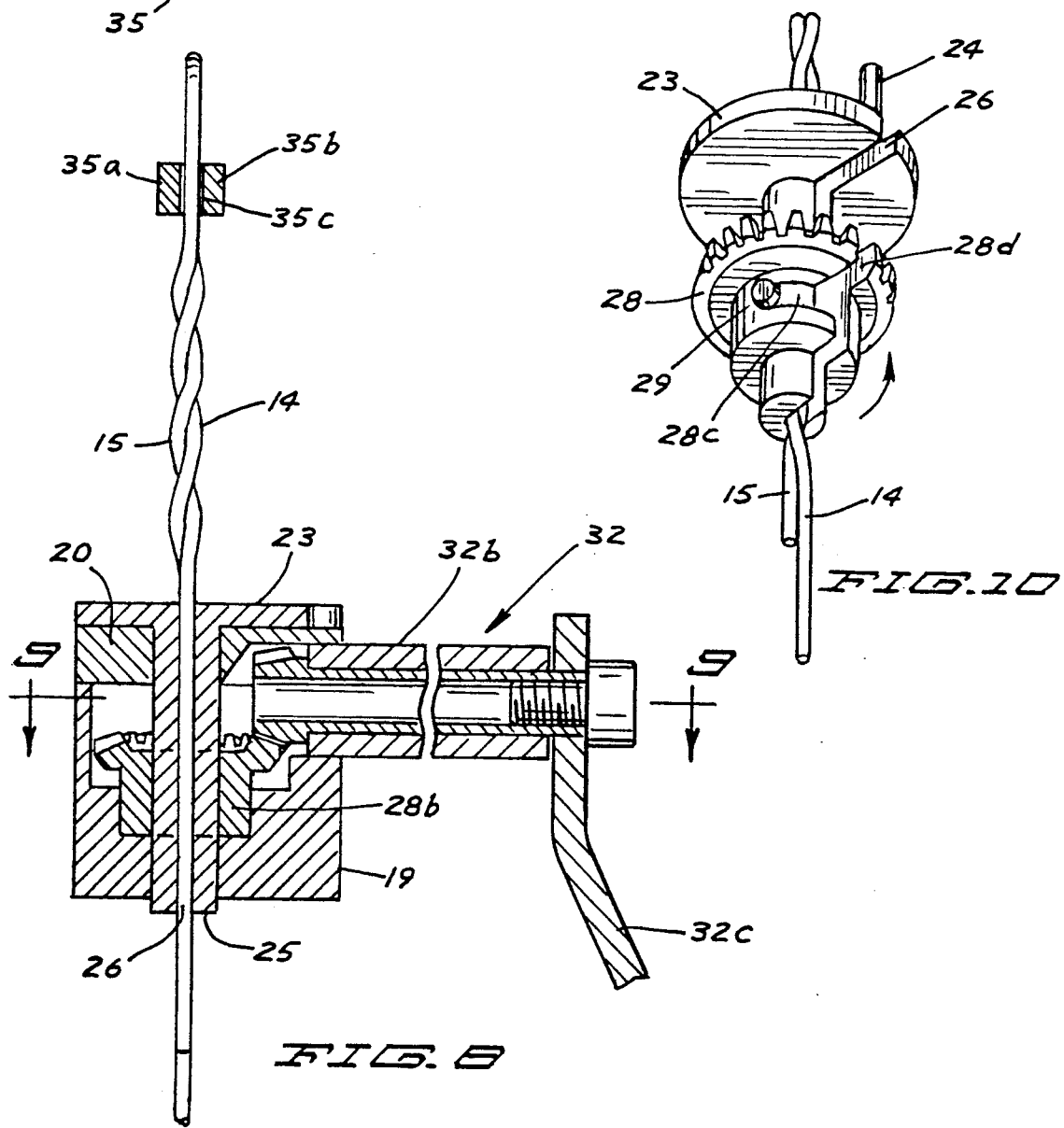

BALE WIRE TWISTER

BACKGROUND OF THE INVENTION

1. Field of Invention

This invention relates to the art of twisting wire to secure baled material.

2. Brief Description of the Prior Art

There does not appear to be any reference material of recent date. Zippel U.S. Pat. No. 2,929,608, Brouse U.S. Pat. No. 3,037,534 and Mueller U.S. Pat. No. 1,521,201 show power operated machines for twisting wire. Gerard U.S. Pat. No. 1,408,936 provides a slot to receive the wire to be twisted having a dog therein having teeth to grip the wire. Hutsell U.S. Pat. No. 2,397,739 embodies a train of gears in an elongated frame. Lennox U.S. Pat. No. 1,937,767 receives wire from a spool which is passed about a bundle and has mechanism to tension and cut off a wire.

The above references are exemplary of the prior art.

SUMMARY OF THE INVENTION

The invention herein is a very simply made and simply operated tool which is small and compact. In baling a product, a wire is looped at one end, the other end is passed about the material to be baled, the free end of wire being passed through the loop and doubled back by hand being pulled under tension through the loop. The double strand thus formed is received in a slot of the device of the invention and by a partial rotation of a gear so locked in a groove in which it cannot rotate and by a simple handle operation is twisted and the device is released.

This is a very compact device which is simple and effective in use.

DESCRIPTION OF THE DRAWINGS

FIG. 1 is a view in side elevation on a reduced scale showing the device of the invention herein in an operating position;

FIG. 2 is an enlarged view in front elevation taken on line 2—2 of FIG. 1 as indicated;

FIG. 3 is a top plan view;

FIG. 4 is a view in vertical section taken on line 4—4 of FIG. 3 as indicated;

FIG. 5 is a view in vertical section taken on line 5—5 of FIG. 3 as indicated;

FIG. 6 is a view in horizontal section taken on line 6—6 of FIG. 5 showing the slot therein in open condition;

FIG. 7 is a view similar to that of FIG. 6 showing the slot therein in closed condition;

FIG. 8 is a view in vertical section taken on line 8—8 of FIG. 9 as indicated;

FIG. 9 is a horizontal section taken on line 9—9 of FIG. 8 as indicated; and

FIG. 10 is a view in perspective showing the operating mechanism outside of the housing of the device herein.

BRIEF DESCRIPTION OF A PREFERRED EMBODIMENT

Referring to the drawings, the wire twisting device 10 of the invention herein is shown in side elevation in operating position in FIG. 1 in connection with a bale 12 having baling wire 11 thereabout. A loop 13 is shown preformed in the wire with the other end portion 14 thereof being pulled through the loop and having its free end 15 doubled back through the loop and received into the device as will be described.

Referring to FIGS. 2 and 3, the device 10 is shown on a larger scale. The housing 17 of said device is shown having a bottom portion 19 and a top portion 20 which may be secured together in various ways such as by welding but are here shown being screwed together as in FIG. 3 by screws 21.

The housing has a cavity 22 therein to accommodate the structure to be described as being therein. Resting upon the upper portion 20 of said housing is a circular plate 23 having a depending shaft 25 extending downwardly through the housing 17 and having a radial slot 26 extending into said plate and into said shaft throughout its length.

Carried on said shaft is a horizontal gear 28 having upstanding teeth 28a and said gear has a depending hub portion 28b. Said hub below the upper toothed portion of said gear has a horizontal arcuate slot 28c therein to the extent of approximately one fourth of its circumference. Said gear is mounted to be rotatable on said shaft 25. Extending outwardly of said shaft through said slot is a projection 29 which could be formed by a set screw tapped into said shaft to project and serve as a stop member limiting the free rotation of said gear about said shaft to the extent of said slot 28c. Said gear has a radial vertical slot 28d therein which can be aligned with said slot 26. Said housing 17 has a vertical radial slot 17a therein which aligns with said slots 26 and 28d. Said slots have the width of a strand of said baling wire 12.

Said cavity 22 will have an appropriate base therein to accommodate a crank 32. Said crank has mounted on its forward end a vertical gear 32a to engage and mesh with said horizontal gear 28. Said gear is carried on a shaft 32b to which is secured a handle 32c.

Upstanding from alongside said housing 17 adjacent one side of said slot 17a in said housing is a vertical supporting member 35 having an upper right angled arm 35a extending over the top of the housing 17 and having a reversely angled end portion 35b forming a slot 35c. Said support 35 is a vertical extension to have an upward support or guide for a baling wire inserted into the slot 17a as will be described.

The device herein is relatively small, compact and easily handled.

To twist a baling wire, as above described, one end of a wire is looped, the wire is disposed about the bale and the unbent free end is brought through the loop, pulled tight and doubled back upon itself as shown in FIG. 2. The device is taken in hand, moved between the baling wire and bale and the doubled over ends of the wire are inserted or moved into the aligned slots 26, 28d and 17a.

Now, prior to inserting the baling wire into said slots, said slots must be aligned. The plate member 23 is rotated by means of its handle 24 to align its seat 26 with the slot 17a of the housing 17. The crank 32 is operated to rotate the gear 28 to have its slot 28d aligned with the slots 26 and 17a. The slot has a width to accommodate only one strand of baling wire so that two strands of wire are held firm in the slot and cannot rotate therein.

The wire has been placed within the slots. Next, the crank is turned to rotate the gear 28 a quarter turn. To this extent the gear will move relative to the shaft 25 and move its hub to overlie the slot 26 of the shaft 25 and having moved past the slot will engage the projection 29 whereby the continued cranking will rotate both the gear 28 and the shaft 25 causing the baling wire to become twisted above and below said housing 17. This secures the baling wire about the bale of material being handled. The slots are again aligned as above described and the baling wire is disengaged from the device.

It is intended here that a predetermined size of a bale will be bound and hence prepared cut lengths of baling wire will be used whereby under this arrangement there is no need to cut wire.

The device herein in being relatively small and compact is very convenient to use and represents substantial improvement over the prior practice of twisting the doubled over strands of baling wire by hand.

It will of course be understood that various changes may be made in the form, details, arrangement and proportions of the product without departing from the scope of the invention which, generally stated, consists in a product capable of carrying out the objects above set forth, in the parts and combination of parts disclosed and defined the appended claims.

What is claimed is:

1. A baling wire twisting device having in combination,
   a housing,
   a rotatable plate upon said housing having a shaft depend through said housing,
   a radial slot extending into said plate member and shaft the length thereof,
   a horizontal gear having upstanding teeth disposed in said housing mounted onto said shaft having relative movement about said shaft,
   a vertical radial slot in said gear corresponding to said slot in said shaft,
   said gear including a depending hub,
   a horizontal slot extending through a portion of said hub,
   a projection extending outwardly of said shaft into said slot of said hub,
   said projection being spaced from said slot in said shaft,
   said mentioned slots having a width to accommodate one strand of baling wire,
   a crank disposed into said housing at right angles to said gear,
   a vertically disposed gear carried by said crank meshing with said horizontal gear,
   said housing having an upstanding vertical support having an angled arm extending over said rotatable plate,
   said arm having a slot therein in alignment with said slot in said plate,
   said slot in said arm having a width to receive one strand of baling wire,
   a doubled over length of baling wire extending from within said slot in said arm to within all of said previously mentioned slots in alignment, whereby initial rotation of said crank moves said horizontal gear and the hub thereof to rotate to overlie said slot in said shaft and upon engagement with said projection thereon and rotates said shaft twisting said strands of said doubled over length of baling wire.

* * * * *